Nov. 8, 1932.  A. L. PARKER  1,887,423

TANK FLANGE COUPLING

Filed Jan. 2, 1929

Inventor
Arthur L. Parker,

By Sturtevant & Mason,
Attorneys.

Patented Nov. 8, 1932

1,887,423

UNITED STATES PATENT OFFICE

ARTHUR L. PARKER, OF CLEVELAND, OHIO

TANK FLANGE COUPLING

Application filed January 2, 1929. Serial No. 329,738.

This invention relates to improvements in couplings for tanks and the like, and more particularly proposes a removable and replaceable coupling for such purposes.

One of the objects of the present invention is to provide a flange coupling which of itself comprises a matrix and die to form the wall of the tank or the like for a tight seal at the connection point.

Another object of the invention is to provide a coupling in which no relative movement between the members in contact with the wall is required for seating the coupling parts.

A further object of the invention is the provision of a cheap and simply manufactured coupling for establishing communication with the interior of a tank or the like.

With these and other objects in view as will appear in the course of the following specification and claims, an illustrative form of the invention has been set forth on the accompanying drawing, with two types of employment of the same.

In this drawing, Fig. 1 is an axial section through a flange coupling, showing the parts in position ready for final assembly.

Figure 1:
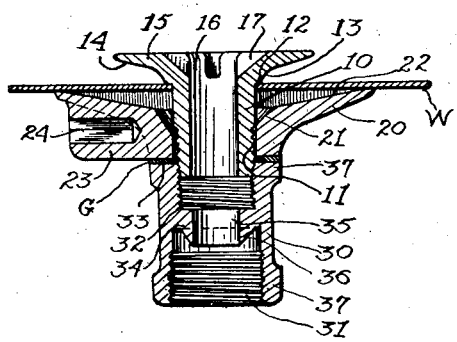

The tank flange coupling is illustrated as comprising three principal portions: (1) a sleeve member adapted to be inserted from the interior of the tank and having a beveled flange to rest on the inside of the tank wall; (2) a counter-flange which freely receives the said sleeve, and has a cavity therein to cooperate with the said beveled flange thereof to form the tank wall to establish a tight seal, and (3) a connection member which likewise serves to draw the first to said parts together.

In the drawing, the sleeve 10 is formed with screw threads 11 at its outer end, and is provided with a shoulder 12 at the opposite end of the sleeve proper, this shoulder joining a beveled or substantially conical surface 13 which passes over to a further beveled or conical surface 14 having a greater angle with respect to the axis of the sleeve. These beveled surfaces form the outwardly directed surface of the end flange 15 of the sleeve. Both flange and sleeve have a passage 16 therethrough by which fluid may be passed to or from the interior of the tank. It is preferred to form the exposed end of the flange, adjacent the passage 16, with notches or slots 17 by which a tool may be engaged with the sleeve to hold or rotate the same.

The external washer or clamping member 20 has its upper surface formed as a cup substantially corresponding to the beveled flange 15, having the substantially conical surface 21 resembling the surface 13 of the flange, and a surface 22 resembling the surface 14 of the flange. It is, however, preferred to have the angle of the surface 22 slightly greater than that of the surface 14, so that the substantial engagement of the flange 15 and washer 20 with the metal wall W of the tank shall occur adjacent the sleeve 10. The washer 20 is provided centrally with a passage which freely receives the sleeve 10 therethrough, while a lug 23 formed integrally with the washer has an aperture 24 therein for the reception of a pin or like tool for holding or rotating the washer 20 itself.

The connection or union 30 may be formed in any desired shape, but is preferably provided with a connection at its outer end for uniting it to the fluid conduit, such as the screw threading 31. The inner end of the connection 30 is provided with internal screw threads 32 to engage the screw threads 11 of the sleeve 10, while a shoulder 33 is provided to form the extreme end surface of the connection 30. Between the illustrated screw threads 31 and 32, a partition wall 34 is formed in the connection, having a passage 35 therethrough of substantially the same diameter as the passage 16. It will be noted that the outwardly directed face of the flange 34 is provided with a conical lip 36 which may be employed as an engaging member for the fluid conduit, in the manner described in my copending application Serial No. 300,485, filed Aug. 18, 1928.

In assembling and operation, the device is handled as follows: The tank wall W is prepared with an aperture of substantially the size of the sleeve 10, and this sleeve is slipped through the aperture from the inside of the tank. The washer 20 is then placed over the sleeve 10. It will be noted from Fig. 1 that when the shoulder 12 rests upon the wall W, a few screw threads of the sleeve 10 project through the washer 20. A sealing gasket G of copper and asbestos, or like material, is placed over the exposed threaded end of the sleeve 10, and the connection 30 is then threaded on. The ends 37 of this connection 30 are preferably formed as hexagons or the like to receive a wrench by which the connection 30 may be rotated. It is found in practice that it is seldom necessary to use any tool to hold the sleeve 10 and its flange 15, or the washer 20, against rotation, since the relative friction between these respective members and the wall W is sufficient.

Figure 2:
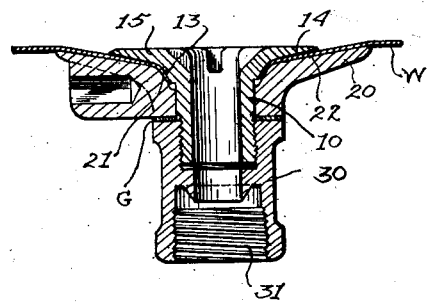
Fig. 2 is a corresponding section with the parts in the completely assembled condition.
Figure 3:
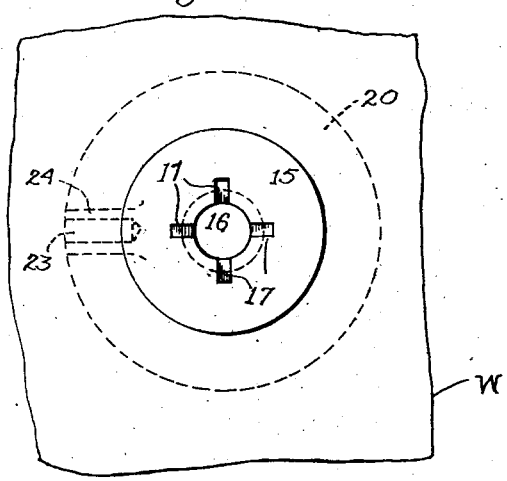
Fig. 3 is a top plan view.

As the connection 30 is rotated, the sleeve 10 is drawn relatively downward in Fig. 1, so that the shoulder 20 and the beveled surfaces 13, 14 cause the wall W to be drawn into conformation with the cup formed in the washer 20, until finally the parts are in the position shown in Fig. 2, in which the surfaces 13, 21 fixedly hold the rim of the tank aperture in sealed condition, the resiliency of the metal producing a fluid-tight joint. Owing to this difference in angularity between the surfaces 14 and 22, there is substantially no relative pressure between these surfaces upon the wall W when the coupling is in normal position, but these surfaces serve in the conforming of the wall to its intended shape. The gasket G serves to maintain the joint tight against any leakage along the screw threads 11, 32 and to frictionally lock the two parts of the coupling together after assembly.

At any time at which it is desired to remove the tank or its parts, the coupling may be released by reverse rotation of the connection 30. It will be understood that the tank wall W does not return entirely to its original shape, but this is not a matter of consequence since the elasticity of the metal will permit a replacement of the parts and the securing of a further adequate seal.

A particular advantage of the invention is that the tank may be made of light gauge or thin duralumin, galvanized iron, tin or the like, and the structure is not weakened as is the case with welding or riveting as commonly employed.

Figure 4:
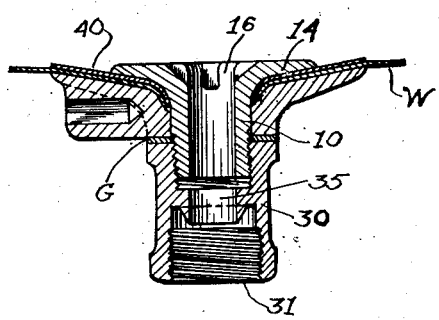
Fig. 4 is a section similar to Fig. 2, but showing a modified use of the coupling.

When very thin material is employed for the tank, it is often advantageous to place a circular disk 40 upon the sleeve 10 before inserting the latter through the aperture in the wall W, this disk being drawn down with the wall to stiffen the tank around the aperture as shown in Fig. 4 when completely assembled. It will be noted also that this same arrangement may be employed for packing or resealing a tank where the metal adjacent the aperture has been overstrained so that the seal at 13 leaks, as when the metal of the tank material has not been properly chosen to withstand the strains thereupon.

It will be understood that the connection illustrated at 31 may be of any desired type for connection to the fluid conduit.

The invention is not limited solely to the form of execution shown, but may be modified in many ways within the scope of the appended claim.

I claim:

In a flange coupling for a tank having a relatively thin and elastically deformable wall, a sleeve having a large end flange located inside the tank and bearing against the said wall with the sleeve located in an aperture of said wall, the wall-engaging surface of said flange being adapted to elastically deform the wall as the parts are drawn tight during assembly, a washer of greater diameter than said flange located around said sleeve outside the tank wall and having a recess for receiving said end flange below the plane of the upper end of said washer and providing a substantially mating surface opposite said wall-engaging surface whereby to provide a large area of engagement between said flange and the tank wall, and a connection member for engaging both said sleeve and washer for pulling said flange relatively toward and into said washer and holding said flange and washer engaged with the elastically deformed portion of said wall, so that the flange is located below the original surface of said wall whereby to permit full drainage of liquid from said tank through said sleeve.

In testimony whereof, I affix my signature.

ARTHUR L. PARKER.